Jan. 22, 1924. 1,481,777
W. W. ROSENFIELD NOW BY JUDICIAL
CHANGE OF NAME W. W. LAIRD
MOTOR WINDING APPARATUS
Filed April 29, 1918 2 Sheets-Sheet 2
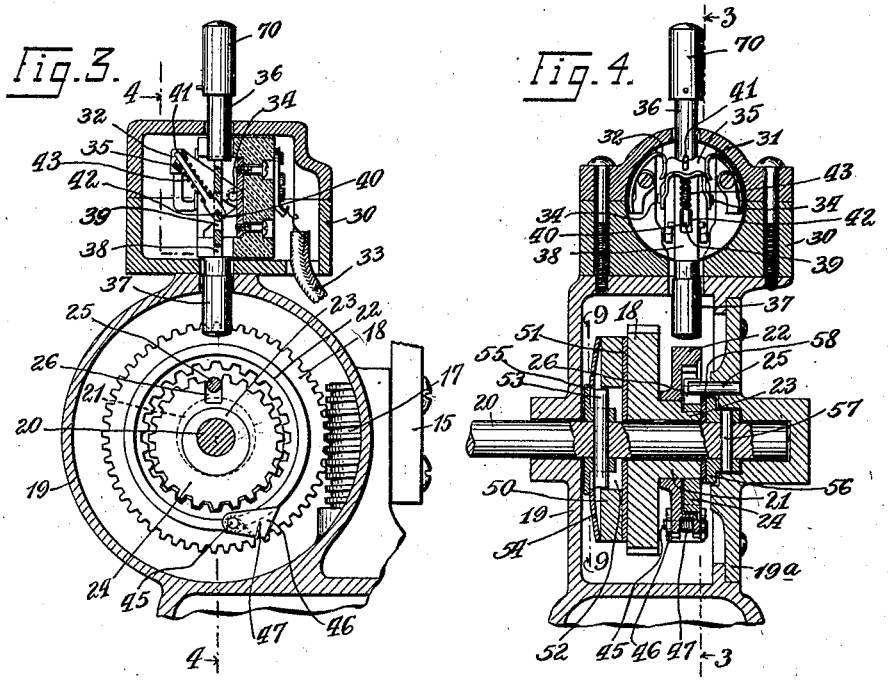
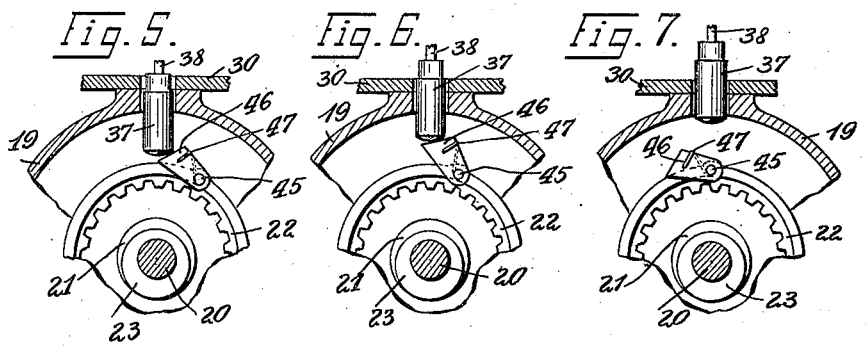
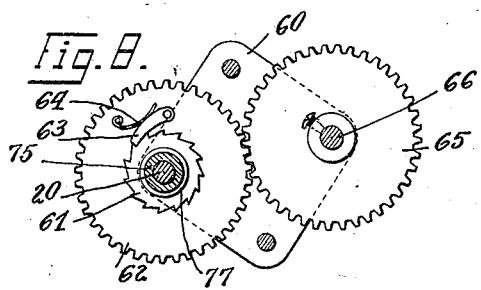
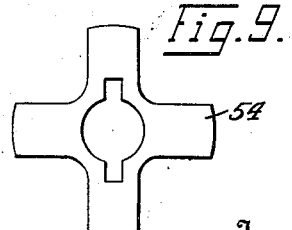

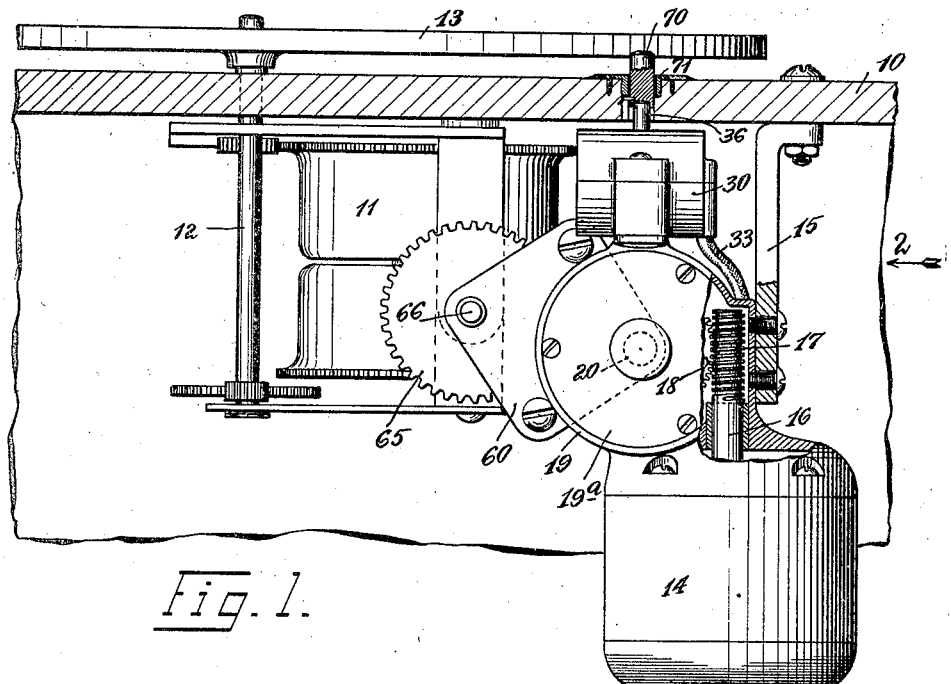

Patented Jan. 22, 1924.

1,481,777

UNITED STATES PATENT OFFICE.

WILLIAM W. ROSENFIELD, OF NEW YORK, N. Y.; NOW BY JUDICIAL CHANGE OF NAME WILLIAM W. LAIRD.

MOTOR-WINDING APPARATUS.

Application filed April 29, 1918. Serial No. 231,379.

*To all whom it may concern:*

Be it known that I, WILLIAM W. ROSENFIELD (now, by judicial change of name, WILLIAM W. LAIRD), a citizen of the United States, residing at New York city, in the county of New York and State of New York, have invented certain new and useful Improvements in Motor-Winding Apparatus, fully described and represented in the following specification and the accompanying drawings, forming a part of the same.

The invention relates to winding apparatus for spring motors or the like, and is particularly adapted to the winding of spring motors for driving phonographs.

Various objects of the invention are to provide a simple and efficient apparatus for winding such spring motors or the like by means of an electric motor, and an apparatus which is conveniently assembled with the spring motors of common manufacture, in which the operation of the winding motor is automatically discontinued in an improved manner, and in which also the spring motor or the like may be wound up independently of the electric motor.

Further objects, features and advantages will more clearly appear from the detailed description given below taken in connection with the accompanying drawings which form a part of this specification.

In the drawings Figure 1 is a side view of a spring motor and a winding apparatus therefor embodying my invention in its preferred form, the spring motor being shown as adapted to drive a phonograph and a portion of the container for the motors being shown in section, and some parts being broken away to more clearly illustrate others.

Figure 2 is an end view of the apparatus show in Figure 1 looking in the direction of the arrow 2.

Figure 3 is a section taken on the line 3—3 of Figures 2 and 4.

Figure 4 is a section taken on the line 4—4 of Figure 3.

Figures 5, 6 and 7 are detail views taken on the same section as Figure 3 with the eccentric gear removed and illustrating the automatic opening of the electric motor control switch.

Figure 8 is a detail section taken on the line 8—8 of Figure 2.

Figure 9 is a face view of the spring plate of the friction clutch taken on a line 9—9 of Figure 4.

Referring to the various figures and particularly to Figures 1 and 2, 10 represents a part of the usual container or casing for the spring motor 11 and the winding apparatus therefor. The spring motor 11 is adapted to drive, through suitable gearing, a shaft 12 which rotates the table 13 adapted to carry the phonograph or talking machine record, in a manner well understood by those skilled in the art.

14 represents an electric motor adapted to be secured to the top board or wall of the casing 10 by means of a supporting bar 15. The motor 14 is provided with an armature shaft 16 having thereon a worm 17 driving a worm gear 18 located in a housing 19 preferably cast integral with a part of the motor casing and provided with a removable side plate 19ª. The worm gear 18 is free to rotate on a shaft 20 (see Fig. 4) and is provided with a hub 21 on which is journalled, concentrically with the worm gear 18, an internal gear 22. The hub 21 is provided with an eccentric extension 23 on which is journalled, eccentrically to the gears 18 and 22, a gear 24 having its teeth meshing with the internal gear teeth of the gear 22. The gear 24 is prevented from rotation by means of a stationary pin 25 extending into a slot 26 in the gear 24. The gear 24 is provided with one less tooth than the gear 22 so that as the gear 24 is given an eccentric movement upon rotation of the eccentric hub 23, the gear 22 is rotated very slowly. By means of this internal gear arrangement a reduction gearing is provided which is simple and conveniently arranged in the small space at hand. The thrust on the motor shaft is taken by a ball thrust bearing provided by a screw cap 27 on the lower end of the motor casing which carries a steel bearing plate 28 which is slightly recessed to receive a bearing ball 29 against which the slightly recessed end of the motor shaft rests. The cap 27 serves as an oil cup, a washer 29ª of absorbent material being provided about the bearing ball.

Secured on top of the housing 19 is an electric switch housing 30 preferably made of insulating material, in which is arranged a snap switch for the controlling of the energization of the electric motor. The switch is provided with two spring contacts 31 and 32 to which the electrical conductors of the electric motor circuit are suitably connected, the conductors being led off from the switch housing at 33. Pivoted at 34 is a switch member 35 which in the position shown in Figures 3 and 4, is adapted to make electrical connection between the contacts 31 and 32. Adapted to slide vertically in the housing 30 are two push pieces 36 and 37 rigidly connected by a flat strip 38 having a central slot 39 therein, into which extends the forked end 40 of a rod 41, the forked end engaging over a pivot cross piece 42 rigid with the flat strip 38. The other end of the rod 41 extends through a hole in the center portion of the switch member 35, and a coiled spring 43 is compressed between the outer end of the switch member 35 and the forked end 40 on the rod 41. With the parts in the position shown in Figures 3 and 4, it will be seen that the spring 43 tends to force switch member 35 upwardly about the pivot 34 so as to maintain electrical connection between the contacts 31 and 32. If the push piece 37 is pushed upwardly until the pivot 42 is above the pivot 34 the spring 43 will tend to force the switch member 35 downwardly so as to open the switch by snap action. Then when it is desired to close the circuit of the electric motor to energize the same, the push piece 36 may be pushed downwardly manually until the pivot 42 is below the pivot 34 when the spring 43 of the snap switch will force the switch member 35 upwardly to close the circuit of the electric motor to energize the same.

For the purpose of opening the switch automatically when the spring motor has been wound up to the desired extent, there is pivoted at 45 on the periphery of the internal gear 22 a cam piece 46 normally held in the position shown in Figures 3, 5 and 7 by spring 47. The cam piece 46 may be made of sheet metal having a flat top section and two lateral flat sides straddling the outer edge of gear 22 to be engaged by the pivot pin 45. As the gear 22 revolves slowly the outer face of the cam piece 46 engages the push piece 37 as shown in Figure 5 and pushes the same upwardly as shown in Figure 6. When the upward movement of the push piece 37 has reached a point where the switch snaps to open position, the push piece will quickly assume the open position as shown in Figure 7 whereupon the cam piece 46, which has been rotated slightly about its pivot 45 by reason of its engagement of the push piece 37, immediately swings downwardly under the action of the spring 47, and into the position shown in Figure 7. The circuit to the electric motor will then be opened and the motor deenergized. When it is desired to energize the motor, the push piece 36 will be operated to close the switch in the manner above described and the push piece 37 will thereby be moved downwardly ready for further engagement with the cam piece 46. By pivoting the cam piece 46 and providing the spring 47 as described, then immediately the snap switch is opened, the cam piece moves away from and out of the line of movement of the push piece 37, so that the cam piece 46 will not interfere with the closing of the snap switch. The engaging face of the cam piece 46 desirably has a backward slant as shown so as to operate most effectively in pushing upward the push piece 37. By reason of the particular gear arrangement shown the parts are encompassed in a small space and the great reduction in gearing necessary for operating the cam piece 46 is accomplished with the use of very few parts.

Arranged on the shaft 20 (see Figure 4) is a friction clutch disc 50 and arranged between the disc 50 and the face of the gear 18 is a friction clutch washer 51 of vulcanized fiber or other suitable material. The disc 50 is provided with a slot 52 into which extends a key 53 for keying the disc 50 to the shaft 20. The key is adapted to have a sliding movement in the slot 52, longitudinally of the shaft 20, so that while the disc 50 will positively rotate the shaft 20 it, at the same time, is capable of slight longitudinal movement thereon. The disc 50 and washer 51 are firmly pressed toward the friction face of the gear 18 by means of a spring plate or disc 54, a face view of which is shown in Figure 9. The spring plate 54 is held in place by a collar 55 which is rigidly secured to the shaft 20 by the pin or key 53. At the opposite end, the gear 18 is held from longitudinal movement on the shaft 20 by means of a collar 56 secured to the shaft 20 by a key 57, a fiber washer 58 being desirably interposed between the collar 56 and the hub of the gear 18.

It will thus be seen that as the worm gear 18 is driven by the electric motor it will tend to rotate the disc 50 through the friction clutch washer 51 and so rotate the shaft 20.

The shaft 20 extends into a bracket frame or link 60 and has secured thereon a ratchet wheel 61 (see Fig. 2). Loosely mounted on the shaft 20 within the bracket frame 60 is a gear 62 having pivoted thereon a pawl 63 and carrying a spring 64 for continuously pressing the pawl 63 into engagement with the teeth of ratchet wheel 61, so that as the ratchet wheel 61 is rotated by the electric motor it will cause the gear 62 to be rotated in the same direction by reason of engagement of the pawl 63 with the ratchet. Should, however, the gear 62 be rotated in the same direction by other means the gear 62 will rotate freely on the shaft 20 and the pawl 63 will slide over the teeth of the ratchet wheel 61 without causing any movement thereof. The gear 62 meshes with a gear 65 rigidly secured to the winding shaft 66 of the spring motor 11 through suitable gearing in a manner well understood by those skilled in the art. In order to prevent the shaft 66 from being rotated in the opposite direction under the action of the spring motor when the winding has stopped, there is provided fast on the shaft 66 a ratchet wheel 67 adapted to be engaged by a ratchet pawl 68 pivoted on the spring motor frame. The shaft 66 extends through the bracket 60 and is screw threaded or otherwise formed at its outer end as at 69 for engagement with the usual manual operating handle for winding up the spring motor. When the spring motor is wound up manually in this way with the shaft 66, the gear 65 will rotate the gear 62 and this is permissible by reason of the pawl and ratchet arrangement 61, 62, 63, which permits the gear 62 to rotate in this direction without tending to rotate the ratchet wheel 61 or shaft 20.

The spacing bracket or link 60 carrying the gear train 62, 65, it will be noted, is pivotally mounted at one end on the spring motor winding shaft 66 and at the other end on the driving shaft 20. By thus swivelling the bracket 60 the motor 14 and parts carried thereby may assume different positions with respect to the winding shaft 66 and spring motor 11 while maintaining the driving gears in operative relation. This is of importance in that in various makes of apparatus containing such spring motors or the like, the position of the winding shaft 66 will be at various distances from the top board of the frame or casing 10 to which the electric motor and parts carried thereby must be secured. The winding apparatus shown will thus be adapted to be placed in cases or containers containing spring motors of various makes and designs and carrying the shaft 66, which the spring motor winding apparatus must drive, at various distances from the supporting wall of the casing 10. As shown in Figures 1 and 2 the push piece 36 extends upwardly into the wall or casing 10 and above it there is provided an additional push piece 70 surrounded by collar 71 for holding it in place, so that when the push piece 70 is pushed down the snap switch is readily closed. The push piece 70 may be considered as an extension to the push piece 36 extending through the casing containing the motors and parts carried thereby. By reason of the arrangement by which the electric motor 14 and parts carried thereby may assume various positions with respect to the spring motor 11 and winding shaft 66, the electric motor 14 may always be secured to the part 10 at the same distance therefrom, so that the push piece 36 will always extend to substantially the same distance into or through the part 10 irrespective of the particular spring motor, or position of the shaft 66 with respect to the supporting wall of the casing 10, to which the winding up apparatus is applied.

Instead of having the ratchet wheel 61 and the gear 62 mounted directly on the shaft 20, a construction such as shown in the drawings is most desirably employed in which the ratchet wheel 61 is fast on a sleeve 75 which extends through bearing openings in the two side plates of the bracket or link 60, and on which also the gear 62 is loosely mounted. When the bracket 60 with its associated parts is assembled with the motor and speed reduction gearing, the driving shaft 20 extends into the sleeve 75 and the sleeve is secured to the shaft to turn therewith, as by means of a set screw 76. This arrangement has the advantage that the gear 62 and the ratchet wheel 61 and the sleeve 75 may be assembled in the bracket frame ready for attachment to the driving shaft 20 in the simple manner above stated. The ratchet wheel is conveniently secured fast on the sleeve by being driven on to a knurled part thereof, or may be secured in other manner, and a spacing collar 77 is provided in the construction shown to prevent relative movement between the sleeve 75 and the bracket frame endwise of the sleeve.

It will be noted that the cam piece 46 will always operate the snap switch to open the same after a predetermined number of revolutions of the electric motor 14. It may be that the spring motor will be wound up before such opening of the snap switch takes place. In such case when the spring motor has been wound up, the friction clutch device 18, 50, 51 will give, so as to permit the electric motor to continue running without further winding up the spring motor. The electric motor will continue to run for the predetermined number of revolutions, whereupon the snap switch will be automatically opened as described, and the electric motor will then be deenergized. The electric motor may then again be energized at any time desired by manually operating the push piece 70, 36 to close the snap switch.

While I have described my improvements in great detail and with respect to one embodiment thereof, I do not desire to be limited to such details since many changes and modifications may be made and the improvements may be embodied in widely different forms without departing from the spirit and scope of the invention in its broader aspects. Hence I desire to cover all arrangements having the combination of elements of any one or more of the appended claims or their equivalents.

What is claimed is:

1. Winding apparatus for spring motors and the like, comprising in combination with a spring motor or the like and the winding shaft thereof, an electric motor, a driving shaft driven by the electric motor, and means for driving the said winding shaft from said driving shaft, said means being adjustable to permit of the electric motor driving the winding shaft through said means with the motor and driving shaft at different positions with respect to the winding shaft.

2. Winding apparatus for spring motors and the like, comprising in combination with a spring motor or the like and a shaft for winding the spring motor or the like, an electric motor, a driving shaft driven by the electric motor, and means for driving the said winding shaft from said driving shaft, said means comprising a gear driven by the driving shaft, a gear driven from said last mentioned gear and driving the winding shaft, and a link pivoted with respect to both winding shaft and driving shaft, permitting the axis of the driving shaft to assume different parallel positions with respect to the axis of the winding shaft while maintaining said gears in operative relation.

3. Winding apparatus for spring motors and the like, comprising in combination with a spring motor or the like and a shaft for winding the spring motor or the like, an electric motor, a driving shaft driven by the electric motor, and means for driving the said winding shaft from said driving shaft, said means comprising a gear train and means permitting one end of the gear train to assume different positions with respect to the other end of the gear train while maintaining the gears in operative relation to drive the winding shaft from the driving shaft.

4. Winding apparatus for spring motors and the like, comprising an electric motor provided with means for attachment to a support to which the spring motor is secured, and driving means whereby the electric motor drives the winding shaft of the spring motor, said driving means being adjustable to permit of the electric motor and driving means being operatively applied to different spring motors in which the said winding shaft is at different distances from the support to which the motors are secured.

5. Winding apparatus for spring motors and the like, comprising an electric motor provided with means for attachment to a support to which the spring motor is secured, and driving means whereby the electric motor drives the winding shaft of the spring motor, said driving means being adjustable to permit of the electric motor and driving means being operatively applied to different spring motors in which the said winding shaft is at different distances from the support to which the motors are secured, and said driving means comprising a gear train transmitting motion from the motor to the winding shaft and a bracket in which the gears of said gear train are journalled, said bracket being swiveled about the winding shaft and pivoted with respect to the electric motor.

6. Winding apparatus for spring motors and the like, comprising in combination with a spring motor or the like and the winding shaft thereof, an electric motor for driving said winding shaft, a manually operated switch for closing the circuit to said electric motor to energize the same, means automatically opening said switch upon the electric motor having made a predetermined number of revolutions, said means including a push piece for opening the switch, a rotary switch operating member driven by the electric motor, a cam pivotally mounted on the rotary member and having a cam face adapted to engage the end of the push piece, and a spring urging the cam to normal position on the rotary member.

7. Winding apparatus for spring motors and the like comprising in combination with a spring motor or the like, an electric motor for winding the spring motor or the like, a switch for closing the circuit to said electric motor to energize the same, a slidably mounted longitudinally movable member operatively connected to said switch and means automatically opening said switch, by contact with said slidable member, said slidable member having a push piece for manually closing the switch, and said switch opening means comprising a member driven by the electric motor and adapted to engage said slidable member to open the switch upon the electric motor having made a predetermined number of revolutions.

8. The combination with a spring motor or the like, of an electric motor for winding the spring motor or the like, a rotary switch operating member driven by the electric motor, a snap switch for closing and opening the circuit of the electric motor to energize and deenergize the same, said switch having a push piece for opening the switch to deenergize the electric motor, and a cam piece movably mounted on the rotary switch operating member and adapted to operate said push piece to open the switch.

9. The combination with a spring motor or the like, of an electric motor for winding the spring motor or the like, a snap switch for closing and opening the circuit of the electric motor to energize and deenergize the same, said switch having a push piece for opening the switch to deenergize the electric motor, a cam piece driven by the electric motor and adapted to operate said push piece to open the switch, said cam piece having means for moving it past said push piece upon the opening of said switch to prevent it from interfering with the closing of the switch.

10. The combination with a spring motor or the like, of an electric motor for winding the spring motor or the like, a switch for opening the circuit of the electric motor to deenergize the same, a worm on the armature shaft of the electric motor, a worm gear driven by said worm, an internal gear arranged concentric with said worm gear, a nonrotatable gear meshing with the internal gear and having a different number of teeth than, and arranged eccentric to, said internal gear, means whereby the worm gear eccentrically moves said eccentric gear to slowly drive the internal gear, and means whereby said internal gear opens said switch after a predetermined movement of said internal gear.

11. The combination with a spring motor or the like, of an electric motor for winding the spring motor or the like, a switch for opening the circuit of the electric motor to deenergize the same, a rotating member for opening said switch, an internal gear carried by said member, a spur gear of smaller diameter engaging within said internal gear, means impelled by the electric motor for driving said gear eccentrically and for preventing its rotation about its axis, and a switch operating member carried by said rotating member.

12. The combination with a spring motor or the like, of an electric motor for winding the spring motor or the like, a switch for opening the circuit of the electric motor to deenergize the same, a rotating member, a cam movably mounted on said member for opening said switch, internal reducing gearing driven by the electric motor and rotating said rotating member, and means for manually closing said switch to energize the motor.

13. The combination with a spring motor for driving a phonograph and a container in which said motor is mounted, of an electric motor mounted within said container for winding said spring motor, a snap switch for closing and opening the circuit to the electric motor to energize and deenergize the electric motor, a spring co-operating with said switch serving to oppose the motion of said switch from its extreme position in either direction to its central position and serving to urge said switch from its central position to its extreme position in either direction, said switch having a push piece extending through a wall of said container to the outside thereof for manually closing the switch, and means for automatically opening said switch to deenergize the motor after the spring motor has been wound, said last mentioned means comprising a member driven by the electric motor and acting to open the switch upon the electric motor having made a predetermined number of revolutions.

14. Winding apparatus for spring motors and the like, comprising an electric motor, a driving shaft driven by the electric motor, and means for driving the winding shaft of the spring motor from said driving shaft, said means being adjustable to permit of the electric motor driving the winding shaft through said means with the motor and driving shaft at different positions with respect to the winding shaft of the spring motor, and said means including a device permitting the spring motor to be wound independently of said electric motor.

15. Winding apparatus for spring motors and the like, comprising an electric motor, a driving shaft driven by the electric motor, means for driving the winding shaft of the spring motor from said driving shaft, said means being adjustable to permit of the electric motor driving the winding shaft through said means with the motor and driving shaft at different positions with respect to the winding shaft of the spring motor, and said means including a device permitting the spring motor to be wound independently of said electric motor, and means automatically deenergizing the electric motor after it has operated the winding means to wind the spring motor.

16. Winding apparatus for spring motors and the like, comprising in combination with a spring motor, a winding motor, a driving shaft driven by the winding motor through speed reduction gearing, and transmission mechanism comprising a spacing link mounted to swivel on said driving shaft and on the winding shaft of the spring motor and gears for driving the winding shaft from said driving shaft and a one-way driving means whereby the winding shaft is permitted to be turned to wind the spring motor without turning said driving shaft.

17. In a winding apparatus for spring motors and the like, a transmission device comprising a link having spaced side plates provided with bearing openings to receive the winding shaft of the spring motor, a sleeve journalled in other bearing openings in said side plates and adapted to receive and to be secured to turn with a driving shaft of the winding apparatus, a gear loose on said sleeve between said side plates, and a pawl and ratchet device, one member of which is carried by said gear and the other member of which is secured to said sleeve to turn therewith.

18. The combination with a spring motor for driving a phonograph, of an electric motor for winding said spring motor, a switch for closing and opening the circuit of the electric motor, a spring co-operating with said switch tending to oppose the motion of said switch from its extreme position in either direction to its central position and to urge said switch from its central position to its extreme position in either direction, means for closing said switch, and means for automatically opening said switch comprising a switch-operating member, a member driven by the electric motor, and a cam piece movably mounted upon said member and adapted to contact with said switch-operating member and to remain in contact therewith while moving said switch to its central position in opposition to said spring and to cease contact therewith when said switch has passed its central position and is urged to its extreme position by said spring.

19. The combination with a spring motor for driving a phonograph, of an electric motor for winding said spring motor, a switch for closing and opening the circuit of the electric motor, a spring co-operating with said switch tending to oppose the motion of said switch from its extreme position in either direction to its central position and to urge said switch from its central position to its extreme position in either direction, means for closing said switch, and means for automatically opening said switch comprising a switch-operating member, a wheel driven by said electric member, and a cam piece pivotally mounted upon said wheel normally lying against said wheel and adapted to contact with said switch-operating member and tip up from said wheel while moving said switch in opposition to said spring to its central position and to return to its normal position against said wheel during the motion of said switch from its central position to its extreme position under the action of said spring.

In testimony whereof I have hereunto set my hand in the presence of two subscribing witnesses.

WILLIAM W. ROSENFIELD.

Witnesses:
   ETHEL JOHNES,
   A. L. KENT.